(No Model.)

H. S. COWLES.
CHAFE IRON.

No. 480,172. Patented Aug. 2, 1892.

Witnesses:
P. A. Phelps
C. H. Longley

Inventor,
Henry S. Cowles, by
Harry P. Williams
Atty.

UNITED STATES PATENT OFFICE.

HENRY S. COWLES, OF EAST HARTFORD MEADOW, CONNECTICUT, ASSIGNOR OF ONE-HALF TO WILLIAM DUFFY, OF SAME PLACE.

CHAFE-IRON.

SPECIFICATION forming part of Letters Patent No. 480,172, dated August 2, 1892.

Application filed December 30, 1891. Serial No. 416,532. (No model.)

*To all whom it may concern:*

Be it known that I, HENRY S. COWLES, a citizen of the United States, residing at East Hartford Meadow, in the county of Hartford and State of Connecticut, have invented certain new and useful Improvements in Chafe-Irons, of which the following is a full, clear, and exact specification.

The invention relates to the class of chafe-irons having rollers, which are attached to the body or running-gear of wagons, carriages, or similar vehicles to prevent the wheels when cramped from wearing away or catching under and upsetting the vehicle.

The object of the invention is to provide the simplest and cheapest possible iron of this class, which shall be neat in appearance, durable, easily fitted to place, and which will not shake and rattle; and the invention resides in details of the construction of a chafe-iron of this class whereby these objects may be attained.

Figure 1:
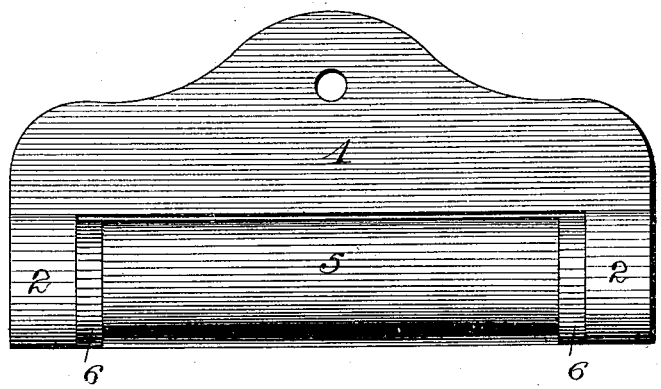
Figure 2:
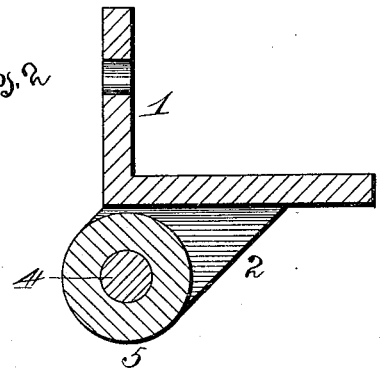
Figure 3:
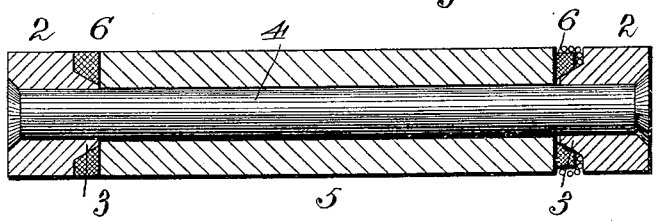

Referring to the accompanying drawings, Figure 1 is a front view of the improved chafe-iron. Fig. 2 is a cross-section of the same, and Fig. 3 is a longitudinal section of an iron.

In the views, 1 indicates the plate or bed, which may be cast flat or angular and provided with screw or bolt holes for attachment to the bottom, side, or corner of the body or running-gear of a wagon, carriage, or similar vehicle in the path of the wheels when cramped. Projecting from the ends of this plate are ears 2, which may be provided on their inner faces with hubs 3, that taper toward each other. A tough wrought or drawn-steel rod 4 is held in perforations in these ears, and upon this rod as a core, which is headed over at each end to permanently and tightly hold it in place, is loosely mounted a hardened cast-iron cylindrical shell or roller 5. Between the ends of the cylinder and the inner faces of the ears upon the tapering hubs are placed annular leather washers 6. These washers are made of a thickness so as to press against the ends of the cylinder and keep it from shaking and rattling against the iron of the ears should it become worn. If hubs are provided upon the inner faces of the ears for the washers, the ends of the cylinder revolve against the washers without rotating them, thus insuring a long life for the simple and cheap leather washers, which are put in position before the core of the roller is permanently fastened in place, and if the hubs are made tapering, as shown, when the washer shrinks and contracts on becoming dry after use the leather will draw down to the smallest part of the hub, or toward the cylinder, and thus prevent it from rattling. Should the washers become worn thin, although the permanently-fastened rod and cylinder cannot be removed to replace the washers any one can wind a few coils of string or twine back of or on top of the washer, which will be then crowded down the hub to the smallest part toward the cylinder and prevent the rattle, as shown at the right-hand end of Fig. 3, and as there is no wear upon the twine it will keep the parts tight a long time.

This chafe-iron is neat, cheap, simple, strong, and easily placed in position, and, while the cast-iron exterior cylinder is very hard to resist wear, chafing, and abrasion from a wheel, the steel core provides a long true bearing and is tough, so that the brittle exterior wearing cylinder will not break or crack when subjected to the pressure of a wheel of a vehicle in cramping.

I claim as my invention—

A chafe-iron for vehicles, consisting of a plate bearing integral ears with integral tapering hubs projecting from their inner faces, a wrought or drawn-steel core supported by the ears and permanently secured thereto, a cylinder surrounding the core, and flexible washers supported by the tapering hubs between the ends of the cylinder and the inner faces of the ears, substantially as specified.

HENRY S. COWLES.

Witnesses:
H. R. WILLIAMS,
P. A. PHELPS.